Nov. 16, 1954     D. F. STRANBERG     2,694,332
HOSE-NIPPLE ASSEMBLING TOOL HAVING FLOATING MANDREL
Filed Nov. 3, 1953
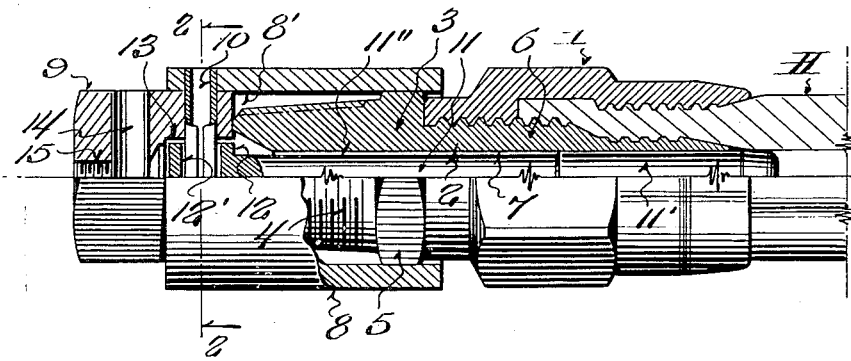
Inventor:
Don F. Stranberg
By
Attorney United States Patent Office 2,694,332
Patented Nov. 16, 1954

2,694,332

HOSE-NIPPLE ASSEMBLING TOOL HAVING FLOATING MANDREL

Don F. Stranberg, Waukegan, Ill., assignor to Charles L. Conroy, Waukegan, and Walter Fritsch, Libertyville, Ill.

Application November 3, 1953, Serial No. 389,971

4 Claims. (Cl. 81—121)

This invention pertains to an assembly tool, and more particularly to a tool for inserting and supporting a coupling insert in the end of a flexible hose and coupling shell during attachment of the coupling to the hose.

More specifically the present tool is designed for assembly attachment of what is commonly known in the art as a reusable coupling, as distinguished from a swaged or pressed on coupling.

Couplings of the foregoing type include a nipple insert provided with a hex or tool receiving head for threading the nipple into a hose and coupling shell to compress the hose wall upon assembly of the parts.

The usual assembly operation consists in first running the shell on the end of the hose, and then threading the insert into the hose bore and shell as they are held against rotation. The latter operation requires considerable force due to frictional resistance encountered during compression of the hose wall. Also, because of the pressure exerted upon the insert during compression of the hose, it is essential to provide a mandrel to support and prevent collapse of the insert, which has a relatively thin wall, particularly in the smaller sizes of couplings.

At the present time it is customary to use a solid or rigid tool, incorporating a mandrel pin and a socket for receiving the head of the insert. Such tools have been found objectionable and inadequate due to the fact that in many instances the longitudinal axes of the insert bore and tool receiving head are relatively disaligned or offset, which causes wedging and bind of the mandrel within the insert bore.

Therefore, the primary object of the present invention resides in the provision of an assembly tool comprising a head receiving socket and a full floating mandrel to compensate for disalignment between the socket receiving head and the longitudinal bore of a coupling insert.

Incidental to the foregoing, a more specific object of the invention is to provide a floating mandrel with an undercut shank to compensate for slight disalignment between end portions of the bore itself, resulting from independent machining of the piece from opposite ends.

With the above and other objects in view, the invention resides in the novel features of construction fully described in the specification, and more particularly defined by the appended claims, it being understood that modifications in structure and design are contemplated within the scope of the invention.

In the drawing:

Figure 1 is a half elevational and half longitudinal sectional view of a tool incorporating principles of the present invention, and illustrating its manner of use in assembly and attachment of a conventional reusable coupling, the view being taken on line 1—1 of Figure 2;

Figure 2 is a transverse sectional view taken on the line 2—2 of Figure 1; and

Figures 3 and 4 are exaggerated schematic views illustrating instances of disalignment between the longitudinal axes of the insert body and its bore.

Referring now more particularly to the accompanying drawing, a conventional type of reusable coupling has been illustrated for the purpose of explanation. The coupling essentially consists of a shell 1 and an insert 2.

In the present instance the insert 2 comprises a body 3 having a threaded male connecting end 4 and a hex or tool receiving head 5. Extending from the body 3 is a nipple 6, the inner end of which is threaded to receive the shell 1, while the outer end is reduced externally for insertion into the bore of a hose H. The body 3 and nipple 6 are provided with a longitudinal bore 7, intended to be concentric but, as previously mentioned, it is extremely difficult to accurately control automatic machine operations, particularly when successive chucking is required. Consequently, the desired concentric bore 7 is frequently disaligned axially with relation to the body 3 and tool receiving head 5, either off center or at slight axial angles, as illustrated schematically in Figures 3 and 4.

The present tool consists primarily of a tubular socket 8, having an internal hex surface 8′ into which one end of a hex block 9 is snugly fitted and locked by a rolled spring dowel 10 that serves as a pintle for a floating mandrel pin 11. The pintle receiving end of the pin 11 comprises an annular head 12, having a transverse diametric bore 12′ of slightly greater diameter than the pintle to allow limited universal floating movement of the mandrel about the pintle. At the same time a concentric recess 13, formed in the inner end of the hex block 9 for receiving the mandrel head 12, is of slightly larger diameter than the head to permit limited axial shifting of the head on the pintle.

In the preferred form of the invention, the outer end 11′ of the mandrel pin 11, is designed to snugly fit that portion of the insert bore 7 within the area of the reduced outer end of the nipple. Back of the supporting end 11′, the mandrel shank 11″ is slightly undercut to provide a clearance between the shank and bore 7, for a purpose to be described later in detail.

In operation the tool may be rotated with a conventional wrench applied to the hex block 9, or a rod (not shown) may be inserted through the transverse bore 14 formed in the block. The end of the block is tapped at 15 for reception of a set screw (not shown) to lock the rod in the block. Obviously, the block 9 could be formed to fit into a machine or a power operated chuck to eliminate manual operation if desired.

In the assembly operation for which the present tool is devised, the coupling shell 1 is first run on the end of the hose H, as shown in Figure 1, after which the shell is held against rotation, preferably in a vise, or with a suitable hand tool. The insert 2 is then positioned on the mandrel 11 with the threaded connecting end of the body butted against the inner end of the hex block 9 and the hex head 5 of the insert located within the socket 8. In such position the relatively enlarged end 11′ of the mandrel snugly fits the bore 7 to support the reduced thin walled end of the nipple 6.

The nipple is then inserted into the hose bore and rotated, either manually or with a power tool, causing the enlarged threaded portion to subsequently engage the thread in the shell 1 and further project the nipple into the hose bore, during which operation the hose wall is compressed between the nipple and the coupling shell in the manner illustrated in Figure 1, which shows the parts in completed assembly relation.

From the foregoing, it will be apparent that the present tool not only facilitates assembly of the coupling, but also supports the weakest part of the insert nipple against possible collapse from excessive pressure as a result of compression forces.

Figures 3 and 4 are greatly exaggerated to schematically illustrate two typical instances of disalignment of portions of the insert bore. In both diagrams the line X—X indicates the concentric axis of the insert, while the heavier dot and dash lines Y—Y indicate the axis of the offset portions of the bores.

In Figure 3 the outer end of the bore 7 is angularly disaligned with relation to the concentric bore of the insert, while in Figure 4 the inner end of the insert bore is disaligned with respect to the concentric axis of the outer bore.

As previously suggested, in production the inserts are formed from bar stock by automatic machine operations, which in the present instance requires rechucking and independent machine operations upon opposite ends of the piece that frequently result in disalignment between portions of the bore, and although the bore may be subsequently reamed, the reamer has a tendency to follow the contour of the bore, which fails to correct the defect.

It will also be appreciated, that while all portions of the bore itself might be concentric, the bore may be disaligned or offset with relation to the axis of the insert body.

All of the foregoing defects are compensated for by the present tool in that the free floating action of the mandrel permits the same to find and follow the bore without undue bind, and in instances where one portion of the bore is disaligned with respect to an adjacent portion, as the supporting end of the mandrel enters the bore in the reduced inner end of the insert, the undercut shank 11' has sufficient clearance in the remaining portion of the bore to prevent contact and bind.

While structural features of the tool as illustrated and described may be varied without departing from the principle of the invention, the specific structure shown is economical, both from a machining standpoint and assembling. The hex or tool receiving block 9 is readily formed from bar stock by machine operations, while the socket 8 can be formed in the same manner from standard tubular stock. The rolled spring dowel, that serves as the pintle for the mandrel also effectively locks the socket 8 to the tool block 9, which avoids the necessity of brazing or otherwise attaching the members by expensive or tedious methods. Therefore, it will be seen that a simple and effective tool has been devised for efficiently assembling couplings, regardless of mechanical defects with respect to disalignments in structural features, which do not impair the usability of the hose coupling.

I claim:

1. An assembly tool of the character described comprising, a socket for receiving a polygonal head, a pintle transversely fixed in said socket, and a mandrel pin having one end journaled on said pintle, said journaled end having a transverse bore of larger diameter than the diameter of said pintle to allow limited universal oscillating movement of said pin on said pintle, the journaled end of said pin being normally spaced from said socket to allow relative axial shifting movement of said pin on said pintle.

2. An assembly tool of the character described comprising, a socket for receiving a polygonal head, a pintle transversely fixed in said socket, and a mandrel pin having one end journaled on said pintle, said journaled end having a transverse bore of larger diameter than the diameter of said pintle to allow limited universal angular movement of said pin on said pintle, the journaled end of said pin being normally spaced from said socket to allow relative axial shifting movement of said pin on said pintle, the shank of said pin being undercut relative to a portion of said pin adjacent its free end.

3. An assembly tool of the character described comprising, a tubular socket for receiving a polygonal head, a polygonal block positioned in said socket having a portion extending into said socket and forming a closure for one end thereof, a dowel extending transversely through said socket and block to secure the same in assembled position, the inner end of said block having a concentric annular recess through which said dowel passes, and a mandrel pin having an annular head positioned in said recess and journaled on said dowel, said annular head being of less diameter than the diameter of said recess to allow axial shifting of said head on said dowel, the journal bore of said head being of larger diameter than that of said dowel to allow limited universal movement of said head on said dowel.

4. An assembly tool of the character described comprising, a tubular socket for receiving a polygonal head, a polygonal block positioned in said socket having a portion extending into said socket and forming a closure for one end thereof, a dowel extending transversely through said socket and block to secure the same in assembled position, the inner end of said block having a concentric annular recess through which said dowel passes, and a mandrel pin having an annular head positioned in said recess and journaled on said dowel, said annular head being of less diameter than the diameter of said recess to allow axial shifting of said head on said dowel, the journal bore of said head being of larger diameter than that of said dowel to allow limited universal movement of said head on said dowel, a portion of said mandrel between its free outer end and journaled head being undercut.

References Cited in the file of this patent

UNITED STATES PATENTS

| Number | Name | Date |
|---|---|---|
| 2,194,069 | Gagne | Mar. 19, 1940 |
| 2,219,266 | Hirsch | Oct. 22, 1940 |
| 2,400,686 | Cox | May 21, 1946 |
| 2,499,056 | Courtot | Feb. 28, 1950 |

FOREIGN PATENTS

| Number | Country | Date |
|---|---|---|
| 934,102 | France | Jan. 7, 1948 |